Sept. 18, 1956    R. E. HENNESSY    2,763,509
ROOF BOW FOR CONVERTIBLE TYPE MOTOR VEHICLE
Filed Oct. 12, 1953    2 Sheets-Sheet 1

R. E. HENNESSY
INVENTOR.

BY
ATTORNEYS

Sept. 18, 1956 R. E. HENNESSY 2,763,509
ROOF BOW FOR CONVERTIBLE TYPE MOTOR VEHICLE
Filed Oct. 12, 1953 2 Sheets-Sheet 2

R. E. HENNESSY
INVENTOR.
BY E. C. McRae
J. R. Faulkner
S. H. Oster
ATTORNEYS

United States Patent Office 2,763,509
Patented Sept. 18, 1956

2,763,509
ROOF BOW FOR CONVERTIBLE TYPE MOTOR VEHICLE

Robert E. Hennessy, Allen Park, Mich., assignor to Ford Motor Company, Dearborn, Mich., a corporation of Delaware Application October 12, 1953, Serial No. 385,451

1 Claim. (Cl. 296—118)

This invention relates generally to motor vehicle bodies of the convertible type, and particularly to an improved roof bow for such a vehicle body.

Heretofore the rear roof bow of the folding top of a convertible type motor vehicle body has been rather complex and expensive to manufacture since it has been required to support three longitudinally spaced tacking strips, one to support the valance stiffening the top fabric between the rear bow and the back light, another to form a support for securing the top material to the bow, and a third to form a support to which the rearward extremities of the quarter pads can be attached. An object of the present invention is to simplify the construction of the rear roof bow to the end that it may be more economically manufactured yet may satisfactorily perform all the functions required. This is accomplished with a construction utilizing only two longitudinally spaced tacking strips. The rear tacking strip is used to support the valance and also the back stay padding, while the front tacking strip supports both quarter pads and also the top fabric. At each side of the front tacking strip a perforated channel-shaped clamping strip is provided cooperating with a cut-away portion of the sheet metal channel supporting the front tacking strip to clamp the quarter pads between the channel and the clamping strip. When thus assembled with the quarter pads clamped in place, the channel-shaped clamping strip forms an extension of the upper portion of the front inner channel of the roof bow to permit the top fabric to be stretched thereover in proper alignment and to be secured thereto with the conventional binding and fastening elements, the fastening elements in the central portion of the roof bow being driven directly into the front tacking strip and in the side portions thereof being driven into the front tacking strip through the perforations in the clamping strip.

Other objects and advantages of this invention will be made more apparent as this description proceeds, particularly when considered in connection with the accompanying drawings, wherein.

Figure 1:
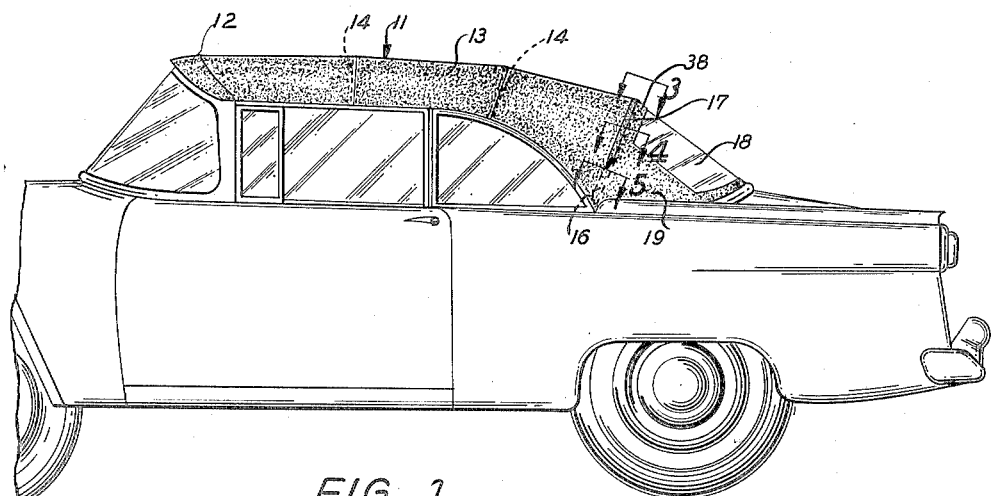
Figure 1 is a fragmentary side elevational view of a motor vehicle body of the convertible type, incorporating a rear roof bow constructed in accordance with the present invention.

Referring now to Figure 1, there is shown a motor vehicle body of the convertible type having a folding top 11 adapted to be secured at its forward end to the windshield header 12 and to be conventionally folded into a well in rearward portion of the body. The folding top comprises a top fabric 13 stretched over a generally conventional folding top framework including intermediate roof bows 14 and a rear roof bow 16. The top fabric 13 is secured to the rear roof bow 16 by means of a reinforced binding 17, as will be described more in detail hereinafter, and rearwardly of the rear roof bow 16 the top is formed with a back light 18 and quarter flaps 19.

Figure 2:
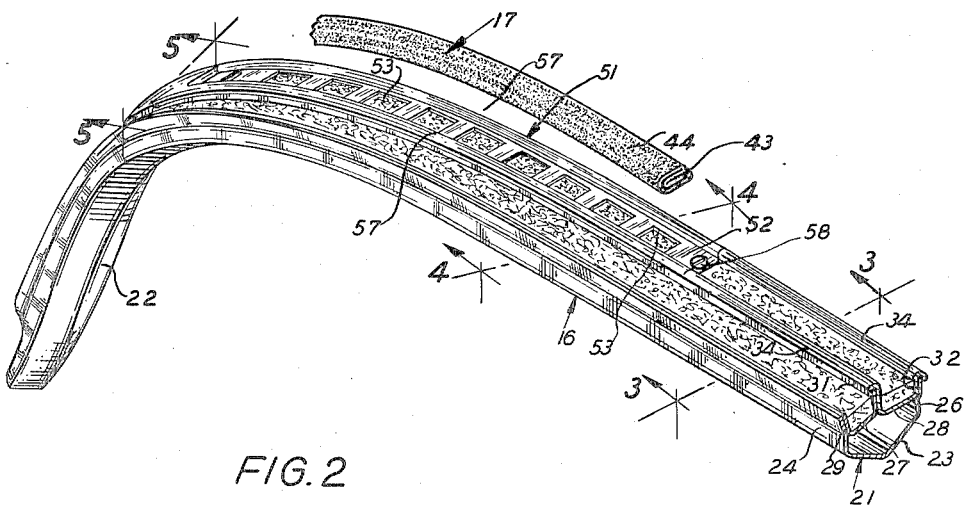
Figure 2 is an enlarged perspective view of the left hand end of the rear roof bow of the vehicle shown in Figure 1, as viewed from a position rearwardly of the roof bow.
Figure 3:
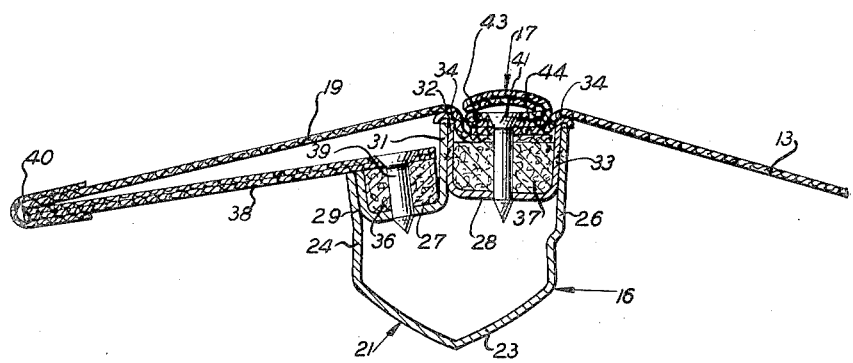
Figure 3 is an enlarged longitudinal cross-sectional view taken substantially on the plane indicated by the line 3—3 of Figure 2, in the central portion of the rear roof bow.
Figure 4:
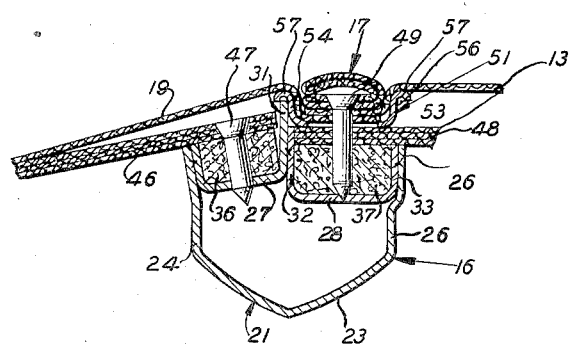
Figure 4 is an enlarged longitudinal cross-sectional view taken substantially on the plane indicated by the line 4—4 of Figure 2, taken adjacent the quarter of the vehicle top through the end portion of the rear roof bow and the clamping strip thereof.
Figure 5:
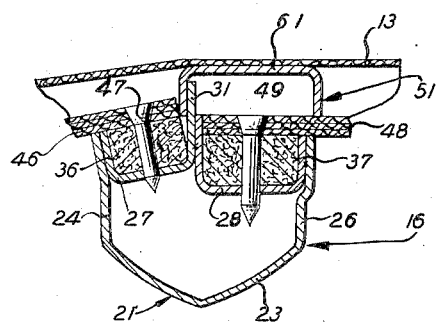
Figure 5 is an enlarged longitudinal cross-sectional view taken substantially on the plane indicated by the line 5—5 of Figure 2, taken adjacent the end of the rear roof bow below the perforated portion of the clamping strip thereof.

The present invention has reference to an improved rear roof bow 16, as illustrated in Figure 2, and in Figures 3, 4 and 5 which show typical sections as through the rear roof bow.

The rear roof bow 16 is formed with an outer U-shaped channel member 21 extending completely across the top of the vehicle body and having downwardly depending side portions 22 adapted to be secured at their lower extremities to the folding top linkage (not shown) to enable the roof bow to be swung rearwardly to a lowered position from the position shown in Figure 1.

The outer channel member 21 of the roof bow is formed with a generally V-shaped base 23 and opposite generally vertically extending side flanges 24 and 26 formed integrally therewith. It will be noted from Figure 3 that the front side flange 26 of the outer channel member extends vertically above the upper edge of the rear side flange 24.

The open upper end of the outer channel member 21 of the rear roof bow is closed by a pair of adjacent inner channel members 27 and 28. In the central area of the rear roof bow (transversely of the roof bow), as seen at the right hand end of Figure 2 and in the cross-section of Figure 3, the inner channel member 27 is located adjacent the rear side flange 24 of the outer channel member 21, with its adjacent side flange 29 spot welded thereto. The upper marginal edges of the side flanges 24 and 29 of the outer channel member 23 and the inner channel member 27 respectively terminate adjacent each other. The forward side flange 31 of the rearward inner channel member 27 projects vertically above the upper marginal edges of the flanges 24 and 29 and is spot welded to the adjacent rearward flange 32 of the forward inner channel member 28. The forward side flange 33 of the inner channel member 28 is spot welded to the adjacent side flange 26 of the outer channel member 21 to complete the assembly of the two inner channel members with the larger outer channel member.

It will be noted that the upper edges of the side flanges 32 and 33 of the forward inner channel member 28 are each rolled outwardly to form rolled edges of the flanges 31 and 26 of the channel members 27 and 21 respectively. The rolled edges 34 provide smooth surfaces for the top fabric to prevent injury thereto.

The inner channel members 27 and 28 have secured therein tacking strips 36 and 37 respectively, formed of a suitable composition material to receive and hold fastening elements.

The tacking strip 36 mounted in the rearward inner channel member 27 supports the valance 38, which is secured to the tacking strip by tacks 39. The valance is formed of a plurality of layers of suitable stiffening material such as a semirigid composition board, to stiffen the vehicle top between the rear roof bow 16 and the rear light 18 as in conventional practice. The fabric of the quarter flaps 19 extends over the valance 38, being secured thereto adjacent the upper edge of the rear light 18 by means of a binding 40. This top fabric 19 also extends over the adjacent upper rolled edge 34 of the front inner channel member 28 and is secured to the tacking strip 37 carried thereby by means of tacks 41.

Similarly, the top fabric 13 forwardly of the rear roof bow is stretched over the adjacent rolled edge 34 of the inner channel member 28 and is secured by the tacks 41 to the tacking strip 37. A suitable reinforced fabric covered binding 17 covers the adjacent edges of the top fabric 13 and 19 and is also held in place by the tacks 41. During assembly the tacks 41 are driven through the lower flange 43 of the binding 17 and through the marginal edges of the top fabric to secure the binding and the fabric to the tacking strip 37. Thereafter, the upper flange 44 of the binding 17 is bent over the heads of the tacks to conceal the latter and present a finished appearance.

The description thus far has concerned itself primarily with the construction of the rear roof bow in a location centrally of the roof in a transverse direction. In this area the rear tacking strip supports the valance 38 while the front tacking strip 37 supports the top fabric. In the side portion of the rear roof bow adjacent the quarter flaps 19 of the top, as shown in Figure 4, the construction of the inner channel member 27 is the same but instead of forming a support for the valance 38 it provides a support for the back stay padding 46, the latter being secured to the tacking strip 36 by means of tacks 47.

The front tacking strip 37 and the front inner channel member 28, at the side portions of the rear roof bow, must support the quarter pads 48 provided at each side of the folding top 11 beneath the top fabric 13 thereof, as well as providing a support to which the top fabric itself may be secured. Referring particularly to Figures 2 and 4, in these side areas the front inner channel member 28 varies in cross-section from its configuration in the central portion of the roof bow. Particularly, the upper rolled edges 34 of the side flanges 32 and 33 of the inner channel member 28 are cut away, and the side flanges 32 and 33 are also partially cut away. With reference to Figure 4 it will be seen that the rearward flange 32 of the inner channel member 28 terminates a considerable distance beneath the upper edge of the adjacent forward side flange 31 of the rear inner channel member 27. The forward side flange 33 of the inner channel member 28 terminates at its upper edge at an even lower point and likewise the adjacent side flange 26 of the outer channel member 21 is cut away in alignment with the upper edge of the flange 33. The arrangement is such that the upper edges of the adjacent flanges 33 and 26 terminate adjacent the upepr edge of the tacking strip 37 to permit the rearward portion of the quarter pads 48 to be stretched across the tacking strip 37 so as to be secured thereto by the tacks 49.

Clamping the quarter pads 48 to the rear roof bow is a channel-shaped perforated clamping strip 51. The clamping strip 51 has a base portion 52 formed with a plurality of transversely spaced square openings 53 formed therein, and is provided with integral side flanges 54 and 56 forming in effect vertical extensions of the side flanges 32 and 33 of the inner channel member 28. The side flanges 54 and 56 of the clamping strip are provided with rolled edges 57 at their upper edge with these rolled edges forming aligned extensions of the rolled edges 34 provided on the front inner channel member 28 in the central portion of the rear roof bow.

The clamping strip 51 is secured to the rear roof bow by means of screws 58 at opposite ends thereof, the screws passing through the tacking strip 37 and the base of the front channel member 28. The upper rolled rearward edge 57 of the side flange 54 of the clamping strip 51 embraces the upper marginal edge of the adjacent flange 31 of the rear inner channel member 27 to align the clamping strip in a direction longitudinally of the vehicle, while the base of the clamping strip is clamped against the quarter pads 48 to secure the latter in place.

After the quarter pads 48 have been secured to the rear roof bow by means of the clamping strips 51 at opposite sides of the roof bow, the top fabric of the main portion 13 of the top are stretched over the upper rolled edges of the clamping strip 51 and are secured in place by means of tacks 49 which extend through the square openings 53 in the clamping strip. The tacks also extend through the quarter pads 48 and into the tacking strip 37 in the front inner channel member 28.

Adjacent the extreme side portions of the rear roof bow, the clamping strips 51 vary in configuration from the perforated channel shaped portion thereof and are in the form of an inverted channel 61, as best seen in Figure 5. This inverted channel forms a smooth support over which the top fabric 13 is stretched.

From the foregoing it will be seen that a relatively small and efficient rear roof bow is provided, requiring only two tacking strips to form proper supports for the top fabric, the valance, and the back stay padding and quarter pads.

What is claimed is:

A roof bow construction comprising a wider channel shaped member, two narrower channel shaped members, said wider and narrower members extending transversely of said roof, said wider member having included therein said two narrower channel shaped members, the sum of the widths of said narrower channel members being approximately equal to the inner width of said wider channel member so that said narrower members nest securely in said wider member, a tacking strip being mounted in each of said narrower members, a perforated plate being superimposed on each end of one of said tacking strips, said narrower channels being oriented in said wider channel to receive for fastening purposes roof material, whereby roof fabric and padding used in a convertible type automobile will be adequately fastened with said roof padding being placed between said plate and said strip and top fabric being placed over said plate with tacking being applied through said top fabric, perforated plate, roof padding and into said tacking strip.

References Cited in the file of this patent
UNITED STATES PATENTS

| | | |
|---|---|---|
| 1,210,439 | Edwards | Jan. 2, 1917 |
| 1,298,836 | Vetter | Apr. 1, 1919 |
| 1,340,307 | Vetter | May 18, 1920 |
| 1,447,191 | Vetter | Mar. 6, 1923 |
| 1,559,533 | Evans | Oct. 27, 1925 |
| 2,501,392 | Keller | Mar. 21, 1950 |
| 2,556,565 | Votypka | June 12, 1951 |